United States Patent
Lebrun et al.

(10) Patent No.: US 9,776,091 B1
(45) Date of Patent: Oct. 3, 2017

(54) SYSTEMS AND METHODS FOR HARDWARE-BASED MATCHMAKING

(71) Applicant: Electronic Arts Inc., Redwood City, CA (US)

(72) Inventors: Jacques Etienne Lebrun, Edmonton (CA); Daniel Martin, Apopka, FL (US)

(73) Assignee: ELECTRONIC ARTS INC., Redwood City, CA (US)

(*) Notice: Subject to any disclaimer, the term of this patent is extended or adjusted under 35 U.S.C. 154(b) by 328 days.

(21) Appl. No.: 14/714,021

(22) Filed: May 15, 2015

Related U.S. Application Data

(60) Provisional application No. 61/994,775, filed on May 16, 2014.

(51) Int. Cl.
*A63F 9/24* (2006.01)
*A63F 13/00* (2014.01)
(Continued)

(52) U.S. Cl.
CPC ............ *A63F 13/795* (2014.09); *A63F 13/34* (2014.09); *A63F 13/35* (2014.09); *A63F 13/358* (2014.09); *H04L 67/104* (2013.01)

(58) Field of Classification Search
CPC ........ A63F 13/34; A63F 13/35; A63F 13/358; A63F 13/795; A63F 2300/407;
(Continued)

(56) References Cited

U.S. PATENT DOCUMENTS

| 5,813,913 A | 9/1998 | Berner et al. |
| 5,894,556 A * | 4/1999 | Grimm ................. G06F 9/5027 463/42 |

(Continued)

OTHER PUBLICATIONS

Agarwal, S., et al., "Matchmaking for online games and other latency-senstive P2P systems." In ACM SIGCOMM Computer Communication Review, vol. 39, pp. 315-326, ACM, 2009.
(Continued)

*Primary Examiner* — Milap Shah
(74) *Attorney, Agent, or Firm* — Knobbe, Martens, Olson & Bear LLP

(57) ABSTRACT

The present disclosure provides a system for a game application host system and game application that can determine the hardware characteristics of a user computing system for use during online matchmaking in a multiplayer game application. The game application can include a hardware analysis module that can evaluate the user computing system to determine the speed and operational characteristics of the hardware. The hardware characteristics can be used for matchmaking by a matchmaking module of the host application system to select hosts and users for a game match. The hardware analysis module that can run tests, such as a data throughput analysis and a processing analysis, to evaluate and rate the user computing system. The ratings can be incorporated into the matchmaking analysis along with other matchmaking characteristics, such as latency, player skill level, geographical location, and other existing matchmaking characteristics, in order to selects users for game matches.

20 Claims, 7 Drawing Sheets

(51) Int. Cl.
*A63F 13/795* (2014.01)
*A63F 13/35* (2014.01)
*A63F 13/358* (2014.01)
*A63F 13/34* (2014.01)
*H04L 29/08* (2006.01)

(58) Field of Classification Search
CPC .......... A63F 2300/408; A63F 2300/513; A63F 2300/5546; A63F 2300/5566; A63F 2300/556; A63F 2300/558; H04L 67/104; H04L 43/00; H04L 43/0876; H04L 43/0882; H04L 43/0888
See application file for complete search history.

(56) References Cited

U.S. PATENT DOCUMENTS

| | | | |
|---|---|---|---|
| 5,961,386 A | 10/1999 | Sawaguchi | |
| 5,964,660 A | 10/1999 | James et al. | |
| 6,012,096 A * | 1/2000 | Link | H04L 29/06 709/233 |
| 6,023,729 A * | 2/2000 | Samuel | G06Q 30/02 463/42 |
| 6,038,599 A * | 3/2000 | Black | H04L 43/00 709/223 |
| 6,128,660 A | 10/2000 | Grimm et al. | |
| 6,322,451 B1 | 11/2001 | Miura | |
| 6,641,481 B1 * | 11/2003 | Mai | A63F 13/12 463/29 |
| 6,699,125 B2 | 3/2004 | Kirmse et al. | |
| 6,755,743 B1 | 6/2004 | Yamashita et al. | |
| 7,031,473 B2 * | 4/2006 | Morais | A63F 13/12 380/251 |
| 7,169,051 B1 | 1/2007 | Mossbarger | |
| 7,240,093 B1 | 7/2007 | Danieli et al. | |
| 7,264,243 B2 | 9/2007 | Yoseloff et al. | |
| 7,288,028 B2 | 10/2007 | Rodriquez et al. | |
| 7,430,719 B2 | 9/2008 | Pettinati et al. | |
| 7,470,197 B2 | 12/2008 | Massey et al. | |
| 7,549,125 B2 | 6/2009 | Dunn et al. | |
| 7,636,719 B2 | 12/2009 | Thompson et al. | |
| 8,360,845 B1 | 1/2013 | Hsu | |
| 8,782,121 B1 * | 7/2014 | Chang | H04L 67/104 709/202 |
| 9,199,173 B2 | 12/2015 | Jensen | |
| 2001/0044339 A1 * | 11/2001 | Cordero | A63F 13/12 463/42 |
| 2002/0037767 A1 | 3/2002 | Ebin | |
| 2002/0086732 A1 | 7/2002 | Kirmse et al. | |
| 2002/0195775 A1 | 12/2002 | Webb et al. | |
| 2003/0236878 A1 * | 12/2003 | Egi | G06F 11/3419 709/224 |
| 2004/0097287 A1 | 5/2004 | Postrel | |
| 2004/0116186 A1 * | 6/2004 | Shim | A63F 13/12 463/42 |
| 2004/0143852 A1 | 7/2004 | Meyers | |
| 2004/0192440 A1 | 9/2004 | Evans et al. | |
| 2004/0215756 A1 * | 10/2004 | VanAntwerp | A63F 13/12 709/223 |
| 2004/0248652 A1 | 12/2004 | Massey et al. | |
| 2004/0255032 A1 * | 12/2004 | Danieli | A63F 13/12 709/229 |
| 2005/0033601 A1 | 2/2005 | Kirby et al. | |
| 2005/0181878 A1 | 8/2005 | Danieli et al. | |
| 2005/0192097 A1 * | 9/2005 | Farnham | A63F 13/12 463/42 |
| 2006/0121990 A1 | 6/2006 | O'Kelley et al. | |
| 2006/0217167 A1 | 9/2006 | Jubinville et al. | |
| 2006/0247055 A1 * | 11/2006 | O'Kelley | A63F 13/12 463/42 |
| 2006/0258463 A1 * | 11/2006 | Cugno | A63F 13/12 463/42 |
| 2006/0287096 A1 * | 12/2006 | O'Kelley | A63F 13/12 463/42 |
| 2006/0287099 A1 | 12/2006 | Shaw et al. | |
| 2007/0035548 A1 | 2/2007 | Jung et al. | |
| 2008/0311981 A1 | 12/2008 | Schugar | |
| 2010/0197405 A1 * | 8/2010 | Douceur | A63F 13/12 463/42 |
| 2010/0273557 A1 * | 10/2010 | Miyaki | A63F 13/12 463/42 |
| 2011/0252079 A1 * | 10/2011 | Werner | H04L 29/125 709/202 |
| 2011/0319175 A1 | 12/2011 | Jensen | |
| 2012/0283021 A1 * | 11/2012 | Riego | A63F 13/12 463/42 |
| 2013/0045803 A1 * | 2/2013 | Kang | A63F 13/00 463/42 |
| 2013/0165234 A1 * | 6/2013 | Hall | A63F 13/00 463/42 |
| 2013/0210527 A1 * | 8/2013 | Kim | A63F 13/35 463/42 |
| 2013/0262203 A1 * | 10/2013 | Frederick | G06Q 30/0209 705/14.12 |
| 2013/0288759 A1 * | 10/2013 | Rom | A63F 13/61 463/7 |
| 2014/0274402 A1 * | 9/2014 | Michel | A63F 13/12 463/42 |
| 2015/0148127 A1 * | 5/2015 | Saraf | A63F 13/795 463/31 |

OTHER PUBLICATIONS

Agresti, A., et al., "Categorical Data Analysis." Springer, 2011.
Bell, C. E., Weighted matching with vertex weights: An application to scheduling training sessions in NASA space shuttle cockpit simulators. European Journal of Operational Research, 73(3):443-449, 1994.
Berge, C., "Hypergraphs: combinatorics of finite sets", vol. 45. Elsevier, 1984.
Bernhaupt, R., "User experience evaluation in entertainment. In Evaluating User Experience in Games", pp. 3-7. Springer, 2010.
Bradley, R. A., et al., "Rank analysis of incomplete block designs: I. The method of paired comparisons." Biometrika, 39(3/4):324-345, 1952.
Delalleau, E., et al., "Beyond Skill Rating: Advanced Matchmaking in Ghost Recon Online." IEEE Transactions on Computational Intelligence and AI in Games, 4(3):167-177, Sep. 2012.
Drake, D. E., et al., "A simple approximation algorithm for the weighted matching problem." Information Processing Letters, 85(4):211-213, 2003.
Duan, R., et al., "Linear-time approximation for maximum weight matching." Joural of the ACM (JACM), 61(1):1, 2014.
Edmonds, J., "Maximum matching and a polyhedrom with 0, 1-vertices." J. Res. Nat. Bur. Standards B, 69(1965):125-130, 1965.
Edmonds, J., "Paths, trees, and flowers." Canadian Journal of Mathematics, 17(3):449-467, 1965.
Elo, A. E., "The rating of chessplayers, past and present." Arco Pub., 1978.
Ferreira, J., et al., "Data mining techniguques on the evaluation of wireless churn." In ESANN, pp. 483-488, 2004.
Gabow, H. N., "Implementation of algoritms for maximum matching on nonbipratite graphs." 1974.
Gabow, H. N., "A scaling algoritm for weighted matching on general graphs." In Foundations of Computer Science, 1985., 26the Annual Symposium on, pp. 90-100, IEEE, 1985.
Glickman, M. E., "Parameter estimation in large dynamic paired comparison experiments." Applied Statistics, pp. 377-394, 1999.
Grapel, T., et al., "Ranking and Matchmaking." Game Developer Magazine, 25:34, 2006.
Hadiji, F., et al., "Predicting player chrun in the wild." In 2014 IEEE Conference on Computational Intelligence and Games, pp. 1-8, IEEE, 2014.
Herbrich, R., et al., "Trueskill: A bayesian skill rating system." pp. 569-576. Advances in Neural Information Processing Systems, 2006.

(56) References Cited

OTHER PUBLICATIONS

Huang, T.-K., et al., A generalized Bradley-Terry model: From group competition to individual skill. In Advances in Neural Information Processing Systems, pp. 601-608, 2004.

Jimenez-Rodriguez, J., et al., Matchmaking and case-based recommendations. 2011.

Lawler, E. L., "Combinatorial Optimization: Networks and Matroids." Courier Corporation, 2001. (Part 1 of 2).

Lawler, E. L., "Combinatorial Optimization: Networks and Matroids." Courier Corporation, 2001. (Part 2 of 2).

Lee, Y., et al., "Measurement and estimation of network QoS among peer Xbox 360 game players." In International Conference on Passive and Active Network Measurement, pp. 41-50. Springer, 2008.

Manweiler, S., et al., "Switchboard: a matchmaking system for multiplayer mobile games." In Proceedings of the 9th international conference on Mobile systems, applications, and services, pp. 71-84. ACM, 2011.

Menke, J. E., et al., "A Bradley-Terry artificial neural network model for individual ratings in gropu competitions." Neural computing and Applications, 17(2): 175-186, 2008.

Minotti, M., Comparing MOBAs: League of Legends vs. Dota 2 vs. Smite vs. Heroes of the Storm. Http://venturebeat.com/2015/07/15/comparing-mobas-league-of-legends-vs-dota-2-vs-smite-vs-heroes-of-the-storm/, 2016. Online; accessed May 2016.

Morik, K., et al., "Analysing customer churn in insurance date-a case study." In European Conferecne on Principles of Data Mining and Knowledge Discovery, pp. 325-336. Springer, 2004.

Myslak. M., et al., "Developing game-structure sensitive matchmaking system for massive-multiplayer online games." In Social Informatics, pp. 200-208. Springer, 2014.

Nguyen, T.-H. D., et al., "Analytics-based AI Techniques for Better Gaming Experience", vol. 2 of Game AI Pro. CRC Press, Boca Raton, Florida, 2015.

Olafsson, S., "Weighted matching in chess tournaments." Journal of the Operational Research Society, 41(1): 17-24, 1990.

Osiakwan, C. N., et al., "The maximum weight perfect matching problem for complete weighted graphs is in pc." In Parallel and Distributed Processing. 1990. Proceedings of the Second IEEE Symposium on, pp. 880-887. IEEE, 1990.

Riskin, E. A., et al., Index assignment for progressive transmission of full-search vector quantization. IEEE Transactions on Image Processing, 3(3):307-312, 1994.

Runge, J., et al., "Churn prediction for high-value players in casual social games." In 2014 IEEE Conference on Computational Intelligence and Games, pp. 1-8, IEEE, 2014.

SuperData. eSports market brief: US accounts for almost half of total viewership. https://www.superdataresearch.com/blog/esports/-brief/, 2016. Online; accessed Mar. 2016.

Tassi, P., Riot's League of Legends' Reveals Astonishing 27 Million Daily Players, 67 Million Monthly. Http://www.forbes.com/sites/insertcoin/2014/01/27/riots-league-of-legends-reveals-astonishing-27-million-daily-players-67-million-monthly/#26ff8e543511, 2016. Online; accessed May 2016.

Van Rantwijk, J., "Maximum Weighted Matching." http://jorisvr.nl/article/maximum-matching, 2013. Online; accessed May 2016.

Weber, B. G., et al., Modeling player retention in madden nfl 11. In IAAI. 2011.

Yannakakis, G., et al., Player Modeling. In Artificial and Computational Intelligence in Games, pp. 45-59. 2013.

Yoon, S., et al., Prediction of advertiser churn for google adwords. 2010.

Lee et al; "Adaptive Server Selection for Large Scale Interactive Online Games", ACM Press, 2004, 6 pgs.

International Search Report Application PCT/US/06/18957 dated Aug. 17, 2007.

\* cited by examiner

SYSTEMS AND METHODS FOR HARDWARE-BASED MATCHMAKING

CROSS-REFERENCE TO RELATED APPLICATIONS

This application claims the benefit under 35 U.S.C. §119 (e) of U.S. Provisional Application No. 61/994,775, entitled "HARDWARE-BASED MATCHMAKING," filed May 16, 2014, the entire content of which is hereby incorporated by reference herein in its entirety and made part of this specification.

BACKGROUND OF THE DISCLOSURE

Field

Aspects of the present invention are directed generally to methods and systems for matching users in an online gaming environment. More particularly aspects of the present disclosure are directed to methods and systems for matching suitable users in an interactive online environment based upon hardware parameters of the computing systems of each user.

Description of the Related Art

Online gaming has become a form of entertainment for millions of people. Accessibility to gaming systems allows a large number of users to connect online and interact with others. Such advances have helped to increase the number of online players in the process. Moreover, the growing population of users is more diverse compared to earlier generations of users. The increase in users can result in more diverse computing system hardware.

Online gaming services generally match users for a game match based on network latency, geographical location, and user profile information, such as a player skill level within a game. The skill level can be defined by many different and unique criteria, such as number of wins or number of losses. Such criteria help a novice player that is unfamiliar with many of the different facets of a particular game and/or game type matched with other novice players similarly unfamiliar. Additionally, highly skilled players can be matched with similarly highly skilled players immediately, thereby allowing players to compete against other players having a commensurate skill level.

SUMMARY OF EMBODIMENTS

One embodiment discloses a method for matchmaking in a network-based game application, the method comprising: receiving, by a game application server, a plurality of data throughput ratings each associated with a user computing system based, at least in part, on throughput analysis data associated with a storage device of the corresponding user computing system; receiving, by the game application server, a plurality of data processing ratings each associated with a user computing system based, at least in part, on the processing analysis data associated with a central processing unit of the corresponding user computing system; selecting, by the game application server, one of the plurality of user computing systems as a host computing system for a game match based at least in part on a data throughput rating and a data processing rating associated with the user computing system; selecting, by the game application server, one or more of the plurality of user computing systems as match participants for a game match based at least in part on the data throughput rating associated with the individual user computing systems; and initiating, by the game application server, the game match with the host and the match participants.

Another embodiment discloses a method for hardware analysis of user computing systems for matchmaking in a network-based game application, the method comprising: determining, by a hardware analysis module of a user computing system, throughput analysis data associated with a storage device of the user computing system; generating, by the hardware analysis module, a data throughput rating associated with the user computing system based at least in part on the throughput analysis data; determining, by the hardware analysis module, processing analysis data associated with a central processing unit of the user computing system; generating, by the hardware analysis module, a processing rating associated with the user computing system based at least in part on the processing analysis data; sending, by the hardware analysis module, the data throughput rating and data processing rating to a game application server; receiving, by a game application of the user computing system, instructions to host an instance of a game match from a game application server, wherein the instructions to host the game match are based, at least in part, on the data processing rating associated with the user computing system; and initiating, by the game application, the game match with a plurality of participants, based, at least in part, instructions received from the game application server wherein the plurality of participants associated with user computing systems are selected based, at least in part, on individual data processing ratings.

A further embodiment discloses a system for matchmaking in a network-based game application, the system comprising: a hardware processor configured to implement computer-readable instructions, wherein the instructions cause the hardware processor to: receive matchmaking ratings associated with a plurality of user computing systems, each matchmaking rating corresponding to a user computing system and based, at least in part, on throughput analysis data associated with a storage device of the corresponding user computing system; receive host ratings associated with the plurality of user computing systems, each host rating corresponding to a user computing system and, based at least in part, on a processing analysis data associated with a central processing unit corresponding to the user computing system; select a user computing system of the plurality of user computing systems as a host for a game match based at least in part on the host rating associated with the selected user computing system; select one or more user computing systems of the plurality of user computing systems as match participants for the game match based at least in part on the matchmaking rating associated with the selected one or more user computing systems; and initiate the game match with the host and the one or more match participants.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Figure 1:
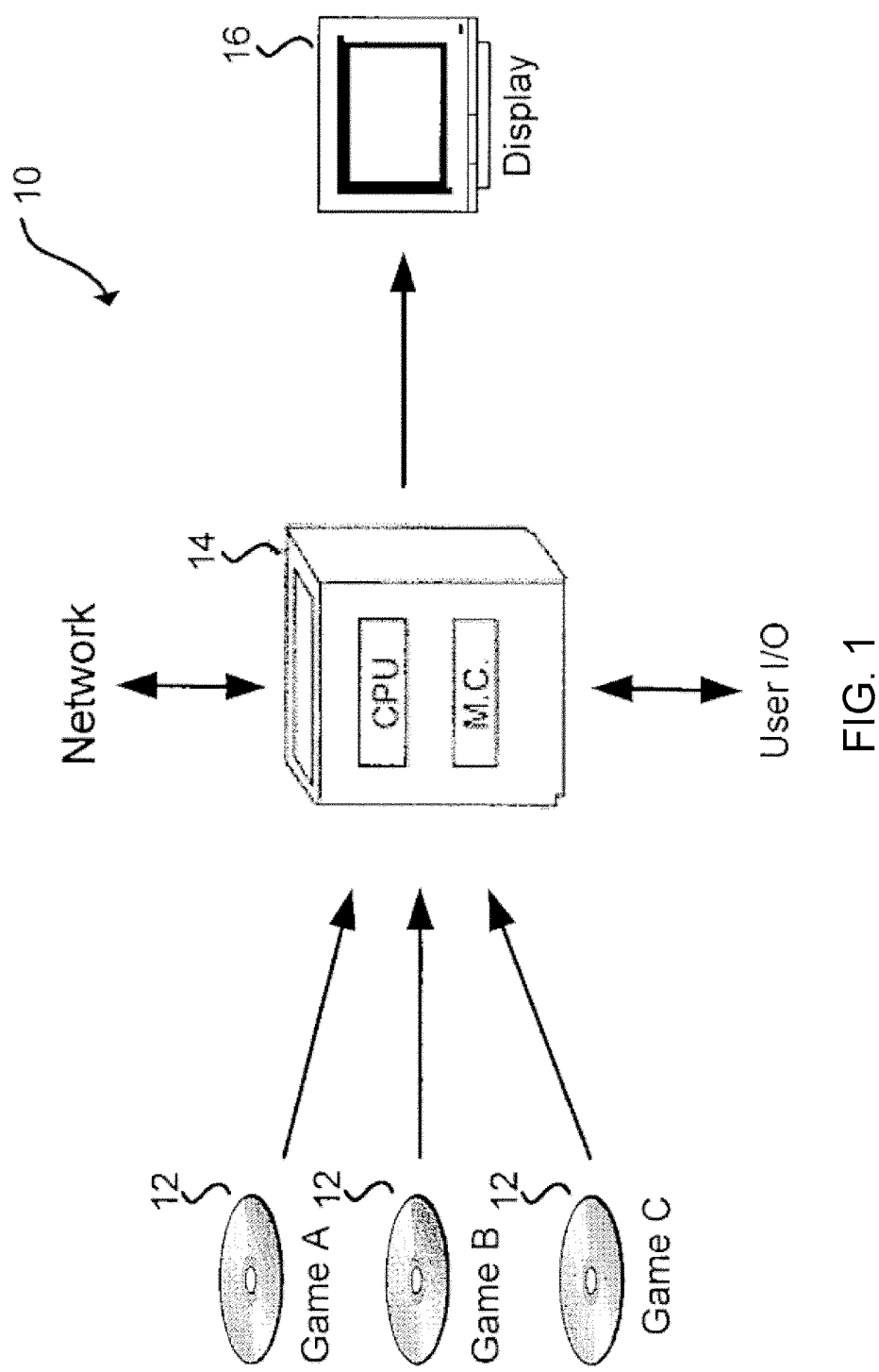
FIG. 1 illustrates an embodiment of a game system.

In the following description of various illustrative embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present disclosure.

Introduction

In network-based ("online") multiplayer games, a matchmaking service, such as an application host system, can provide users with the option to participate in an online game match within a game application with other users. A user can log into a matchmaking service provider to access online gaming experience. However, there are a number of different ways in which a user may connect to an online service for matching purposes. For example, a user may log into a matchmaking service through a dedicated game application host system or through an independent matchmaking service. The user may have an account with the matchmaking service provider that can maintain a user profile for the account.

Users can execute and play game applications on a wide variety of general purpose computing systems, such as desktops, smartphones, and laptop computing devices, as well as specialized devices such as game consoles. This can result in a wide performance disparity between users. Users with high-end computing systems can be matched with users that have low-end computing systems. The different computing systems can have vastly different performance and can result in a frustrating experience for users with high-end computing systems that can be subject to the lower performance constraints of a lower-end computing system during a game match.

Illustratively, when a multiplayer game match is initiated, a game environment can be loaded from storage, such as a specific multiplayer map. A loading screen can be displayed to the users selected for the game match. For each user the load time can dependent upon the speed at which the information can be loaded from the storage device on the user's computing system. Some users with faster storage devices, such as a solid state drive (SSD), can load information from storage, such as the game environment, much faster than a mechanically actuated hard disk drive. Illustratively, a user with a SSD may load a game in 5 seconds, whereas a user on a mechanical drive may load the game environment in 30 seconds or more. The user with the SSD may be required to wait until the user with the mechanical storage device to load the game environment before the game match can proceed, which can result in a frustrating experience for the user with the high end computing system.

In some embodiments, an application host system can include dedicated servers for hosting game matches. In such embodiments, the dedicated servers may be tasked with maintaining consistent operation of the game state during game matches. In some embodiments, a game application host system can utilize a peer-to-peer architecture for multiplayer gameplay environments. In a peer-to-peer architecture, a host is selected from the user computing systems to host the game match. The selected host is responsible for operation of the game simulation during the game match. The host is subject to additional processing requirements for operation of the game simulation. The selected host may receive game state inputs from other players at a regular frequency and broadcasts the updates to the computing systems of the other players within the game match. The game state information can include in-game player position, player inputs, and other information related to the operation of game match on each user computing device. The game state information can be transmitted to the host at a regular frequency, such as 10 times per second. The host can process the information received from each user and retransmit it back to the other users. When the host cannot update the other players at the required frequency, the game can become difficult to play for other users within the match.

Therefore, there is a need for matchmaking systems that accumulate hardware parameter data for the user computing systems for matching users in real-time over a computer network. Embodiments of such systems may be able to be built into existing matchmaking systems to provide the matchmaking capabilities that can match users with comparable hardware performance characteristics.

The present disclosure provides embodiments of a system for a game application host system and game application that can determine the hardware characteristics of a user computing system for use during online matchmaking in a multiplayer game application. In some embodiments, the game application can include a hardware analysis module that can evaluate the user computing system to determine the speed and operational characteristics of the hardware. The hardware characteristics can be used for matchmaking by a matchmaking module of the host application system to select users for a game match. The hardware analysis module that can run tests, such as a data throughput analysis and a processing analysis, to evaluate and rate the user computing system. The ratings can be incorporated into the matchmaking analysis along with other matchmaking characteristics, such as latency, player skill level, geographical location, and other existing matchmaking characteristics, in order to select users for game matches. In some embodiments, by matching user computing systems based, alone or in part, on hardware parameters, the matchmaking module can provide improved operating conditions for users during execution of an online game match.

In some embodiments, the hardware characteristics of the user computing systems can be used to select a host for game applications that utilize a peer-to-peer hosting architecture. The hardware analysis module can use a processing analysis, which may include a throughput analysis, in order to determine a host rating for each user computing system. The host rating can be used to help ensure that the selected host has needed capabilities to host a game match and help minimize negative game play experiences by the users. In some embodiments, matching users based, alone or in part, on the speed of the storage device, which can result in similar load times for users within a game match. The speed of the storage device can be incorporated into a matchmaking rating that can be independent of the host rating.

The term "game application" can refer to any game, application, or service including for example, a particular manufacturer's game, such as Battlefield Hardline™ by EA Digital Illusions CE AB CORPORATION, of Stockholm, Sweden. The term "game match" or "match" can refer to an instance of a game mode within a game application in which a user can participate. For example, a game match can refer to an instance of a multiplayer game within Battlefield Hardline™ at a specific game level.

Overview of Game System Embodiments

FIG. 1 illustrates a game system 10 for providing one or more games to a user according to embodiments of the present disclosure. The system 10 includes one or more game media 12 (game A, game B, game C), a game device 14, and a display 16.

The game media 12 may include one or more game applications that may be used or executed by game device 14 to involve a user in a game. The game medium 12 can store logic for execution of a game by the system 10. In one embodiment, the game application provided for execution by the game device 14 is an electronic video game. Games can be individually stored, in whole or in part, on physical media, such as compact disk read-only memories (CD-ROMs), digital versatile disks (DVDs), game cartridges, flash drives, or other storage media. A game, such as game A, can be inserted in, coupled to, or in communication with the game device 14 so that the game device 14 can read all or part of a game application and/or related game data found on game media 12. In some instances, game applications can be at least partially stored on the game device 14, or accessible from another computing system, such as over a network.

The game device 14 is a computing device that includes one or more processors, such as central processing units (CPUs), graphics processing units (GPUs), and data storage combined or in separate elements. In some embodiments, the game device 14 can be a specialized computing device created for the purpose of executing game applications. The games executed by the game device 14 may be created using a particular application programming interface (API) or compiled into a particular instruction set that may be specific to the game device 14. In other cases, the game device 14 may be a general purpose computing device capable of executing game applications and non-game applications. For example, the game device 14 may be a laptop, tablet, or desktop computer. The game device 14 may also be connected to a network and game device 14 may access games that are not included on game media 12 by, for example, accessing another computing system over the network. In some such embodiments, game A, game B, and/or game C may be accessed through the network, in whole or in part, and may not be individually stored on game media 12. To allow a user to select from a plurality of available games available on game media 12 or via the network, a display 16 might present a list of the games provided by game applications on game media 12.

A game application may also be referred to as a game code and/or a game program. A game application should be understood to include software code that a game device 14 can use to provide a game for a user to play. A game application might comprise software code that informs a game device 14 of processor instructions to execute, but might also include data used in the playing of the game, such as data relating to constants, images and other data structures created by the game developer including prerecorded animation data. A user may interact with the game application and game device 14 through user input/output (I/O) devices.

Figure 2:
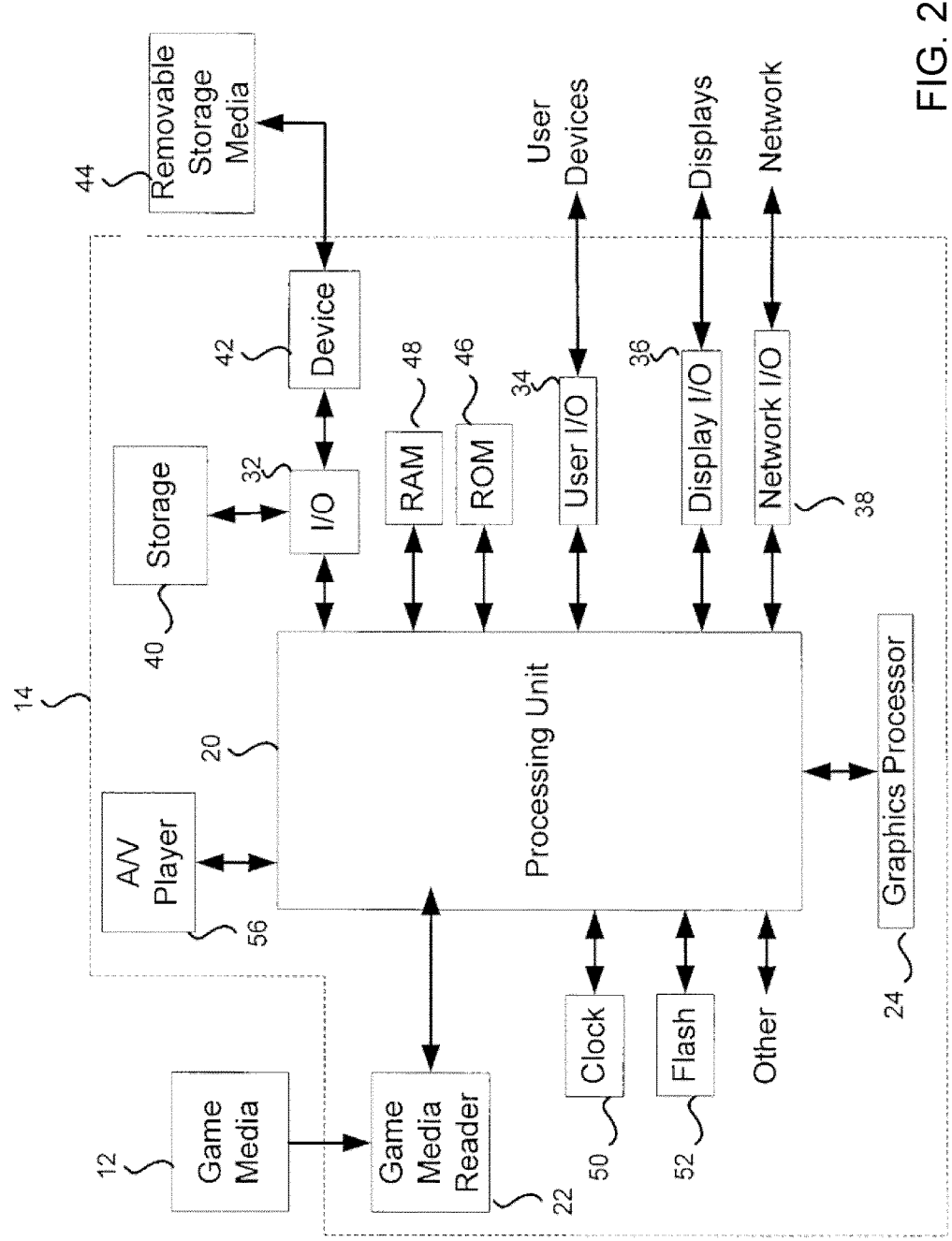
FIG. 2 illustrates an embodiment of game device.

FIG. 2 illustrates an embodiment of game device 14 according to the present disclosure. Other variations of the game device 14 may be substituted for the examples explicitly presented herein, such as removing or adding components to the game device. As shown, the game device 14 includes a processing unit 20 that interacts with other components of the game device 14 and also external components to game device 14. A game media reader 22 is included that communicates with game media 12. Game media reader 22 may be an optical disc reader capable of reading optical discs, such as CD-ROM or DVDs, or any other type of reader that can receive and read data from game media 12.

Game device 14 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the game device 14 may include a discrete graphics processor 24 that is separate from the processing unit 20. In some such cases, the graphics processor 24 may have separate RAM from the processing unit 20. Game device 14 might be a handheld video game device, a dedicated game console computing system, a general-purpose laptop or desktop computer, a smart phone, a tablet, a car console, or other suitable system.

Game device 14 also includes various components for enabling input/output, such as an I/O 32, a user I/O 34, a display I/O 36, and a network I/O 38. I/O 32 interacts with storage element 40 and, through a device 42, removable storage media 44 in order to provide storage for game device 14. Processing unit 20 can communicate through I/O 32 to store data, such as game state data and any shared data files. In addition to storage 40 and removable storage media 44, game device 14 is also shown including ROM (read-only memory) 46 and RAM 48. RAM 48 may be used for data that is accessed frequently, such as when a game is being played.

User I/O 34 is used to send and receive commands between processing unit 20 and user devices, such as game controllers. Display I/O 36 provides input/output functions that are used to display images from the game being played. Network I/O 38 is used for input/output functions for a network. Network I/O 38 may be used during execution of a game, such as when a game is being played online or being accessed online.

Display output signals produced by display I/O 36 comprising signals for displaying visual content produced by game device 14 on a display device, such as graphics, user interfaces, video, and/or other visual content. Game device 14 may comprise one or more integrated displays configured to receive display output signals produced by display I/O 36. According to some embodiments, display output signals produced by display I/O 36 may also be output to one or more display devices external to game device 14, such a display 16.

The game device 14 can also include other features that may be used with a game, such as a clock 50, flash memory 52, and other components. An audio/video player 56 might also be used to play a video sequence, such as a movie. It should be understood that other components may be provided in game device 14 and that a person skilled in the art will appreciate other variations of game device 14.

Program code can be stored in ROM 46, RAM 48 or storage 40 (which might comprise hard disk, other magnetic storage, optical storage, other non-volatile storage, or a combination or variation of these). In a common arrangement, part of the program code is stored in ROM that is programmable (ROM, PROM, EPROM, EEPROM, and so forth) and part of the program code is stored on removable media such as game media 12 (which can be a CD-ROM, cartridge, memory chip, or the like, or obtained over a network or other electronic channel as needed). In general, program code can be found embodied in a tangible non-transitory signal-bearing medium.

RAM 48 (and possibly other storage) is usable to store variables and other game and processor data as needed. Typically, RAM is used and holds data that is generated during the play of the game and portions thereof might also be reserved for frame buffers, game state, and/or other data needed or usable for interpreting user input and generating game displays. Generally, RAM 48 is volatile storage and data stored within RAM 48 may be lost when the game device 14 is turned off or loses power.

As game device 14 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

Figure 3:
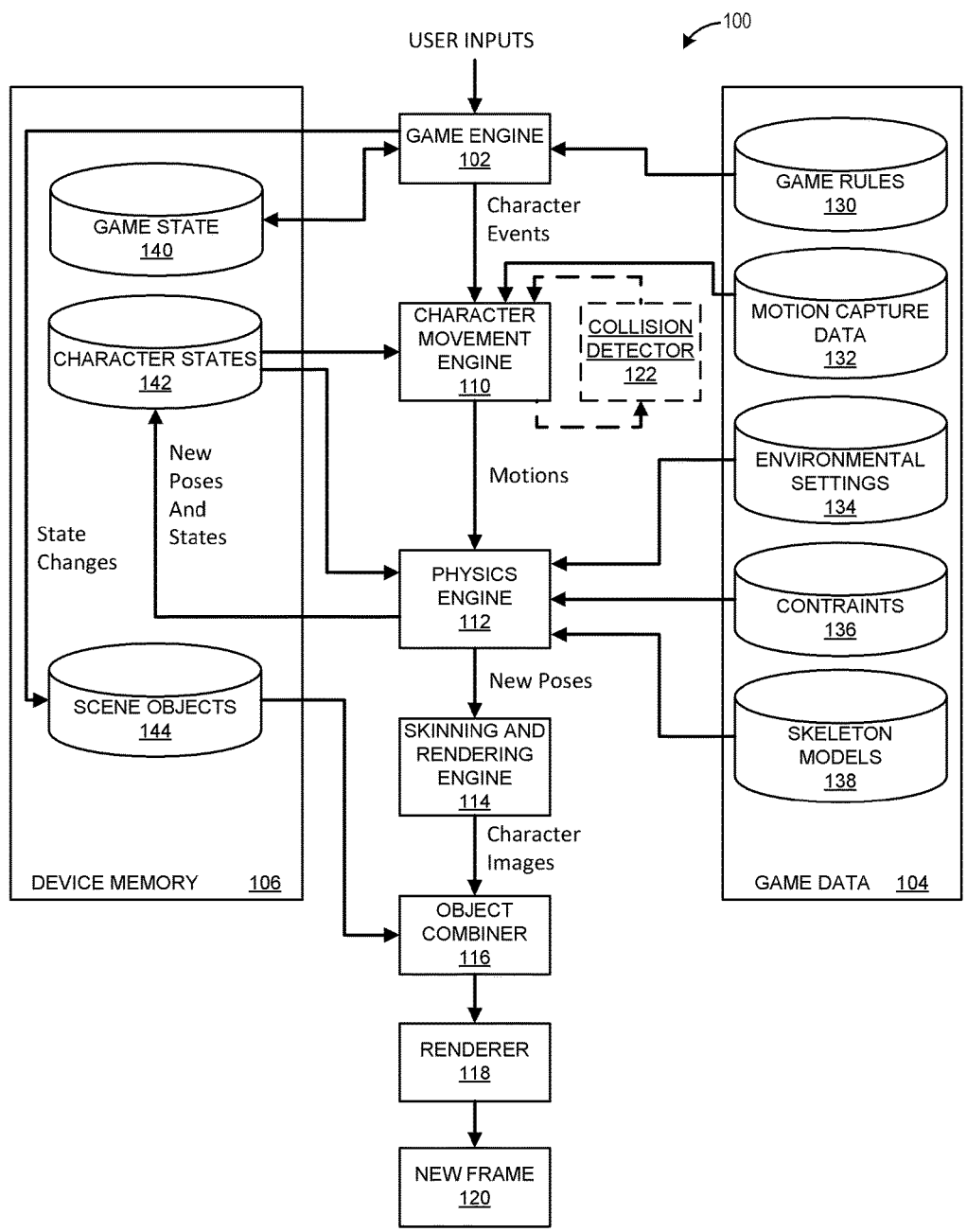
FIG. 3 illustrates an embodiment of elements of a game system.

FIG. 3 illustrates an embodiment of some elements of game system 10 in more detail, especially those involved in execution of gameplay within a game application. The game device 14 provides for user input to control aspects of the game according to game rules 130. Game rules 130 might be specified in instruction form on game media 12. Examples of game rules 130 include rules for scoring, possible inputs, actions/events, movement in response to inputs, and the like. Other components can control what inputs are accepted and how the game progresses, and other aspects of gameplay. The elements in FIG. 3 illustrate elements used for generating and rendering animation within the game based on various inputs.

As shown in FIG. 3, by system 100, user inputs, and game code/data may be used to generate display video. The game system also handles playing the game and presenting corresponding audio output. The description of FIG. 3 is focused on generating frames of display video for the game. A game engine 102 receives the user inputs and determines character events, such as actions, collisions, runs, throws, attacks, and other events appropriate for the game.

The character events are conveyed to a character movement engine 110 that determines the appropriate motions the characters should make in response to the events and passes those motions on to a physics engine 112. Physics engine 112 determines new poses for the characters and provides those new poses to a skinning and rendering engine 114. Engine 114 in turn provides character images to an object combiner 116 to combine animate, inanimate and background objects into a full scene. The full scene is conveyed to a renderer 118, which generates a new frame 120 therefrom.

Game code/data 104 is shown comprising game rules 130, prerecorded motion capture poses/paths 132, environmental settings 134, constraints 136 (such as strength and velocity constraints), and skeleton models 138. The device executing the game might have memory 106 for game state 140, character states 142 and scene object storage 144. Character states 142 can comprise storage for a current pose of characters being animated.

During operation, the game engine 102 reads in game rules 130 and considers game state 140 to arrive at character events. Character movement engine 110 reads in prerecorded poses/paths 132 as well as character states 142. An optional collision detector engine 122 can perform a process that can derive the desired motions for characters based on collisions. Motions might be expressed as a set of external forces, target poses and the like. As needed, character movement engine 110 may also use other data elements shown, such as skeleton models 138, also referred to as rigs. Rigs are often used in character animations. A typical rig may comprise a collection of character components, such as a skeletal structure and a mesh to be skinned over the skeletal structure. A typical rig comprises a skeletal structure for a character and includes a plurality of degrees of freedom. A rig may also comprise a set of animation controls that enable an animator to move the various components of the character in order to create motion in an animation. Character movement engine 110 might also introduce character movements for randomness, personality, and so forth.

The physics engine 112 has as its inputs the skeleton models of various characters, environmental settings 134, character states such as current poses (for example, positions of body parts expressed as positions, joint angles or other specifications), and/or velocities (linear and/or angular) of body parts and motions provided by character movement engine 110, which can be in the form of a set of force/torque vectors for some or all body parts. From this information, physics engine 112 generates new poses for the characters using rules of physics and those new poses can be used to update character states 142 and are also provided to rendering engine 114. Where invisible skeleton models are used, character states 142 might contain current position of visible "graphics" of characters as well as the invisible rag-doll skeleton characters.

The skinning and rendering engine 114 takes into account the surfaces, colors and textures of the body parts of posed characters and renders character images. Object combiner 116 can then combine the character images with inanimate and background objects obtained from scene objects store 114 to provide a complete scene to renderer 118.

Example Networked Computing Environment

Figure 4:
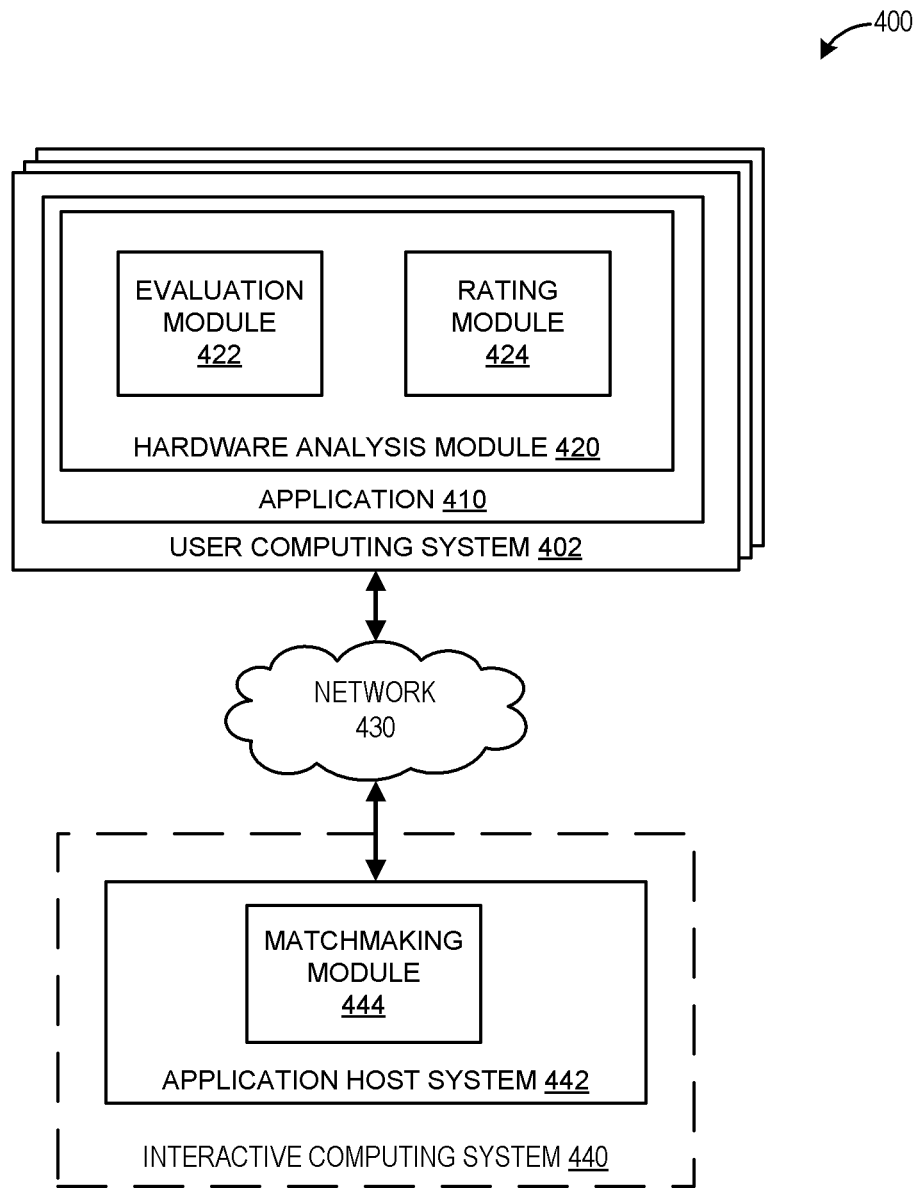
FIG. 4 illustrates an embodiment of a networked computing environment that can implement one or more embodiments of a network-based multiplayer matchmaking system.

FIG. 4 illustrates an embodiment of a networked computing environment 400 that can implement one or more embodiments of a hardware-based matchmaking system 412. The networked computing environment 400 can include one or more user computing systems 402 and one or more interactive computing systems 440. To simplify discussion and not to limit the present disclosure, FIG. 4 illustrates only one user computing system 402 and one interactive computing system 440. The user computing system 402 may communicate via a network 430 with the interactive computing system 440. Although only one network 430 is illustrated, multiple networks 430 may exist.

The user computing system 402 may include hardware and software components for establishing communications over a communication network 430. For example, the user computing systems 402 may be equipped with networking equipment and network software applications (for example, a web browser) that facilitate communications via a network (for example, the Internet or an intranet). The user computing system 402 may have varied local computing resources such as central processing units and architectures, memory, mass storage, graphics processing units, communication network availability and bandwidth, and so forth. Further, the user computing system 402 may include any type of computing system. For example, the user computing system 402 may include any type of computing device(s), such as desktops, laptops, video game platforms, television set-top boxes, televisions (for example, internet TVs), network-enabled kiosks, computerized appliances, wearable devices (for example, smart watches and glasses with computing functionality), and wireless mobile devices (for example, smart phones, PDAs, tablets, or the like), to name a few. In some embodiments, the user computing system 402 may include one or more of the embodiments described with respect to the game device 14.

Typically, the user computing system 402 is capable of executing an application 410, such as a video game, that may be stored and/or executed in a standalone and/or a distributed environment. For example, the user computing system 402 may execute a portion of a game and the interactive computing system 440, or an application host system 442 of the interactive computing system 440, may execute another portion of the game. For instance, the game may be a multiplayer online battle area (MOBA), a multiplayer first person shooter, a massively multiplayer online role-playing game (MMORPG), or other game application that includes a client portion executed by the user computing system 402 and a server portion executed by one or more application host systems 442. For the present discussion, the application 410 can include a distributed application or an application that includes a portion that executes on the user computing system 402 and a portion that executes on at least one of the application host systems 442.

As stated above, the user computing system 402 may execute one or more applications, such as the application 410. Typically, the application 410 is a videogame. However, the application 410 is not limited as such and can include any application where a matchmaking system would match multiple users together based on an analysis of the hardware system components of the user computing system. The illustrated embodiment of the matchmaking system 400 includes a hardware analysis module 420, an evaluation module 422, and a rating module 424.

Hardware Analysis Module

In the illustrated embodiment, the hardware analysis module 420 can be executed within the game play application 410. In some embodiments, the hardware analysis module 420 can operate independently of the game application, such as in pre-launch application that is loaded prior to execution of the game application 410. The pre-launch application may provide an interface that is configured to launch a plurality of game applications. In such embodiments, the various game applications may utilize the same or different application host systems 442. The hardware analysis module 420 can be configured to execute an evaluation module 422 for evaluation of the operation and hardware characteristics of the user computing system 402, and a rating module 424 for rating the hardware characteristics of the user computing system 402 based on the results generated by the evaluation module 422.

In some embodiments, the hardware analysis module 420 can test the user computing device at various times, such as, for example when the game application loads, when the hardware analysis module loads, prior to the initiation of each game match, or as required by the game application. As the hardware characteristics do not generally change, in some embodiments, it may be sufficient to determine to evaluate the hardware characteristics a single time when the game application loads. The evaluation and rating of the user computing system can be opaque to the user.

The evaluation module 422 can execute tests to evaluate hardware-based performance characteristics of the user computing device. The evaluation module can perform a throughput analysis that can be used determine Input/Output (I/O) performance of the storage device 40, for example the hard disk drive, of the user computing system 402. The speed of the hard drive can significantly affect the time that the game application 402 requires to load a game environment within a game application. For example, after initiation of a game match, the game environment for the selected game match is loaded into the game application. The I/O performance of the storage, such as the storage device 40 illustrated in FIG. 2, can determine the speed at which the game environment loads.

The data throughput analysis can execute one or more tests in order to determine the speed of the storage device 40. For example, the evaluation module 422 can execute code that measures the amount of time that it takes for the storage device to load a set amount of data into memory. In some embodiments, the evaluation module 422 can determine a read time of the storage device by executing a test where an identified file is read and the time required to read the file is recorded. In some embodiments, the evaluation module 422 can determine a seek time of the storage device by executing a test where multiple files are read and the results are recorded. In some embodiments, the evaluation module can determine the type of storage device, such as whether the device is a solid state drive or a mechanical drive.

Based on the results of the one or more tests, the rating module 424 can determine a throughput rating, also referred to as a speed rating, associated with the user computing device. In some embodiments, the rating can be based on a relative scale, such as, for example, a score from 0 to 100, with 100 being the fastest and zero being the slowest. In order to determine the rating, the rating module can convert the measurements from the throughput test based on minimum and maximum ranges of speeds to specific scores. In some embodiments, the rating is based on information stored in a database that provides a rating associated with a storage device type. For example, a SSD storage device can be in one category, and a mechanical storage device can be in a different category. In some embodiments, the storage devices can be more finely categorized. For example, there can be multiple categories of SSD storage devices and multiple categories of mechanical storage devices.

In some embodiments, the throughput analysis rating can be incorporated into a matchmaking rating that can be used by the matchmaking module to select users for individual matches. For example, the matchmaking rating can be an aggregate rating based, alone or in part, on the throughput analysis rating, latency, geographical location, user profile information, and/or other factors that can be used by the matchmaking module to select users for multiplayer game matches.

The evaluation module 422 can perform a processing analysis that can be used to determine the processing characteristics of user computing system 402. For example, the evaluation module 422 can empirically determine the performance of the CPU, GPU, memory, and other components of the system. The evaluation module 422 can benchmark processing characteristics of the CPU and GPU using one or more tests. In some embodiments, a single test can be run to evaluate a plurality of hardware components, whereas in other embodiments, multiple tests can be run to evaluate performance of the user computing system. For example, in some embodiments, to evaluate the CPU, a predetermined problem or calculation can be executed and the time required to complete the problem can be measured. In some embodiments, to evaluate the GPU, a predetermined scene can be rendered and the rendering time and framerate can be measured. The tests can be performed by the evaluation module 422 in the background and can be opaque to the user.

The rating module 424 can determine a rating based on the results of the one or more tests. In some embodiments, the components can receive individual scores based on the result of the test. In some embodiments, a single score may be applied to different components. In some embodiments, individual scores can be generated for the components and an aggregate score can be generated for the user computing system. In some embodiments, the aggregate score can use weighted values applied to the individual components score. For example, the CPU can receive a score multiplied by a first weighted value, and the GPU can receive a score multiplied by a second weighted value.

In some embodiments, a hardware profile may be taken of the user computing system. The hardware profile can identify the specific types of the hardware components. The rating module can include a database that includes predefined scores associated with each type of hardware component. For example, the database may identify CPUs, and each CPU may be provided with a predetermined score. In such embodiments, the scores applied to each component can be used to determine an aggregate system score for the user computing system without an empirical analysis.

A host rating can be based on the processing analysis rating. In some embodiments the host rating can be based on the processing analysis rating and additional factors such as, for example, latency and/or geographic location. The host rating can aggregate characteristics of the user computing system, such as, for example, the processing analysis rating (including, for example, a CPU rating and/or a GPU rating), throughput analysis rating, latency, geographical location, and/or other characteristics of the user computing system that can affect performance of the user computing device 402 during hosting of a game match using a peer-to-peer architecture. Each input for the host rating can have a different weight applied to generate the aggregate host rating.

In some embodiments, the host rating can include historical data associated with a user computing device. The historical data can include data that represents how the user computing device performed as a host in previous game matches. For example, the historical data can identify the number of updates to the game state that the host provided on time compared to the number of updates that the host missed during the match. In some embodiments, the historical data can be used to weigh a calculated host rating.

As illustrated in FIG. 4, the interactive computing system 440 may include one or more application host systems 442. The one or more application host systems 442 can include one or more computing devices, such as servers and databases that may host and/or execute a portion of one or more instances of the application 410. Further, the matchmaking system 444 can be capable of selectively grouping user computing devices for a multiplayer match based, alone or in part, on the results of a host selection process and/or matchmaking process performed by the matchmaking module 444.

Matchmaking Module

In some embodiments, the matchmaking module 444 can select users for a game match in multiplayer game based, alone or in part, on a matchmaking rating. As described above, the matchmaking rating can be based on the throughput analysis rating. In some embodiments the matchmaking rating can be based on the throughput analysis rating and additional factors such as, for example, latency, geographical location, user profile information, and/or other factors. The matchmaking rating can be provided by the game application 410. In some embodiments, the matchmaking module is configured to generate the matchmaking rating based on information received from the game application 410. In some embodiments, the matchmaking module receives or determines a matchmaking rating separately from a throughput analysis rating. The separate ratings can be used for selecting users for a game match. In some embodiments, the throughput rating can help to ensure that the user computing devices will load the game environment for the game match at approximately the same time such that there is not a significant difference between the load times of the selected users.

The matchmaking module 444 can determine a host for game applications that utilize peer-to-peer architectures for multiplayer game matches. The matchmaking module 444 can determine the host of a match based, alone or in part, on a host rating. In some embodiments both the processing performance rating, the throughput rating, and other parameters can be factored into an aggregate host rating. The host rating can be provided by the game application 410. In some embodiments the matchmaking module is configured to generate the host rating based on information received from the game application 410. The host rating can be separate from the matchmaking rating. For example, the matchmaking module 444 can utilize the host rating to select a user computing device as a host for a game match. The matchmaking module 444 can then use the matchmaking rating of the host and other user computing devices to populate the game match.

The network 430 can include any type of communication network. For example, the network 430 can include one or more of: a wide area network (WAN), a local area network (LAN), a cellular network, an ad hoc network, a satellite network, a wired network, a wireless network, and so forth. Further, in some cases, the network 430 can include the Internet or an intranet.

Matchmaking Process

Figure 5:
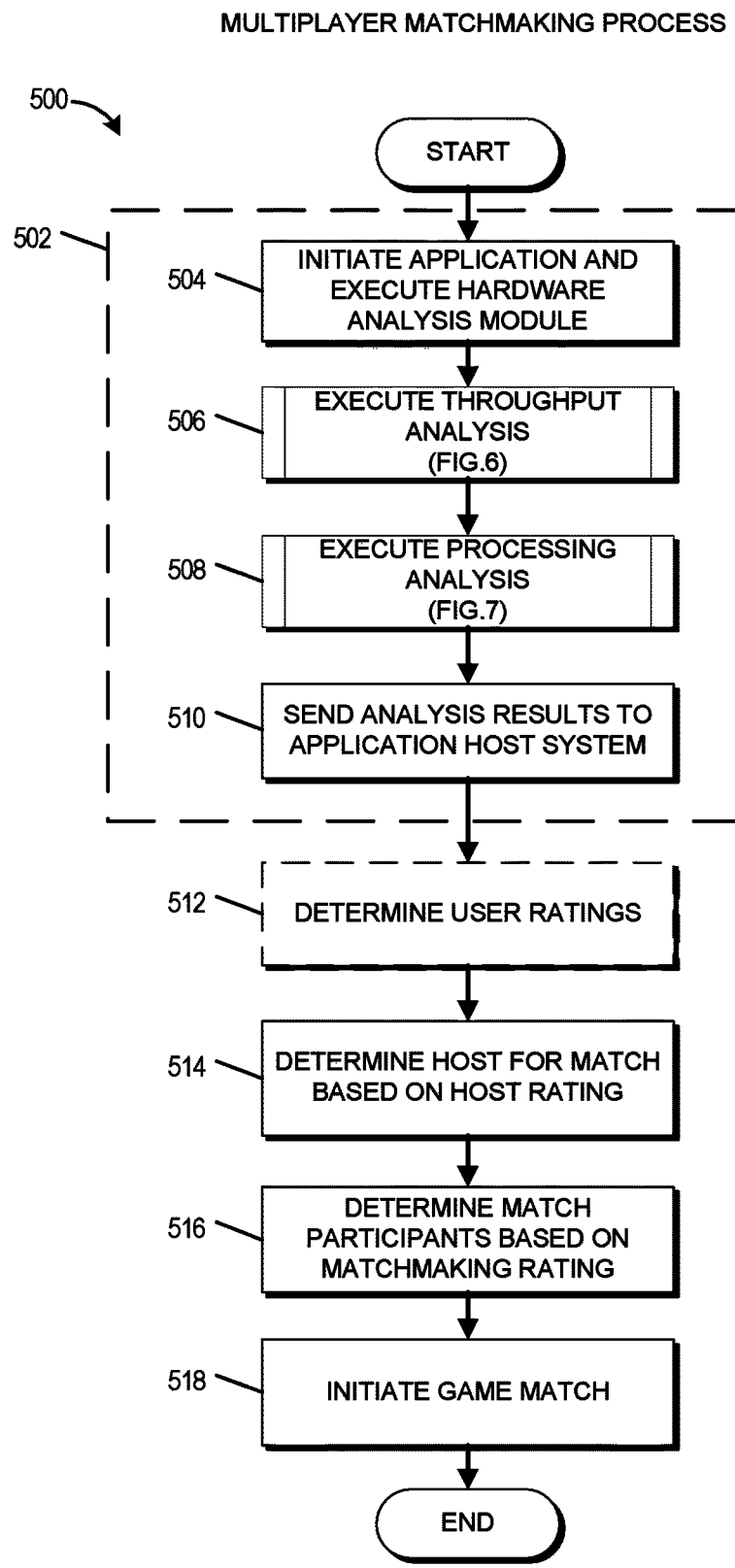
FIG. 5 presents a flowchart of an embodiment a of network-based multiplayer matchmaking process.

FIG. 5 presents a flowchart of an embodiment of a matchmaking process 500 for a multiplayer game match in an online gaming environment. The process 500 can be implemented by any system that can match users with other users in a multiplayer game match. For example, the process 500, in whole or in part, can be implemented by matchmaking module 444, the application host system 442, the hardware analysis module 420, the evaluation module 422, the rating module 424, and/or the application 410, among others. Although any number of systems, in whole or in part, can implement the process 500, to simplify discussion, the process 500 will be described with respect to particular systems.

Each of blocks 504, 506, 508, and 510 encapsulated by box 502 can be performed for each user computing system of a plurality of user computing systems in communication with the application host system 442. At block 504, a game application is loaded on a user computing system, and the hardware analysis module 420 is executed or otherwise loaded into memory for operation on the user computing system. In some embodiments, the hardware analysis module 420 can be executed prior to the game application executing. The hardware analysis module 420 can be configured to communicate with the application host system 442.

At block 506, a throughput analysis can be executed by the hardware analysis module 420. Embodiments of the throughput analysis can be performed as discussed in more detail in FIG. 6. The data throughput analysis can output a raw analysis results and/or a throughput analysis rating. The data throughput analysis can provide a throughput analysis rating that provides a rating of the I/O access rates of the storage system of the user computing device.

At block 508, the processing analysis can be executed by the hardware analysis module 420. Embodiments of the processing analysis can be performed as discussed in more detail in FIG. 7. The processing analysis can output a raw analysis results and/or a processing analysis rating. The results of the processing analysis can be used to provide a host rating for use in selecting a host when utilizing peer-to-peer architectures. In some embodiments, where there is a dedicated host server for hosting game matches, the processing analysis may not need to be performed as no host needs to be selected. In some embodiments, even in some embodiments where there is not a peer-to-peer architecture, the processing analysis can be used in the matchmaking process.

At block 510, the results of the throughput analysis and/or the processing analysis can be provided to the application host system 442 for use by the matchmaking module 444. The results of the analysis can include a host rating and/or a matchmaking rating. As discussed with relation to the embodiments of FIGS. 6 and 7, the ratings can be computed locally on the user computing device 402 and provided to the application host system 442. Each user computing system may provide the results to the application host system 442 individually.

At block 512, optionally, the application host system 442 can determine the ratings associated with the user computing system 402. In such embodiments, the application host system 442 can determine some or all of the ratings associated with a user computing system 402. The user computing system can provide the results of the various analyses and the application host system can apply the appropriate algorithms to compute a host rating and/or a matchmaking rating for each user computing system 402. In some embodiments, it can be advantageous to determine the ratings by the application host system 442 because the algorithm for calculating the ratings can be updated without requiring an update to the game application of each user computing system 402. In some embodiments the application host system 442 may receive the data and/or ratings and may perform additional analyses on the results. For example, the application host system may store information that could be used to modify the results of the test based on historical data or other information. In some embodiments that information may be transferred to the local system on the user computing device and could be incorporated into the initial evaluation of the score during the throughput analysis.

At block 514, for peer-to-peer architectures, the matchmaking module determines a host for the match based on a host analysis score. In some embodiments, the host rating can be used to determine the host independent from the matchmaking rating. For example, a viable host can be determined based, alone or in part, on the matchmaking rating and then the process can proceed to block 516. In some embodiments, the selection of the host is dependent upon the matchmaking rating, such that the host is selected from a group of match participants selected based on the matchmaking rating.

At block 516, the matchmaking module 444 can determine the match participants based on matchmaking rating from the plurality of available user computing devices 402. The number of participants of the match can be based on the specific game application and game mode. At block 518, after the match participants are selected, the application host system 442 can initiate creation of the game match. The application host system 442 can provide instructions to the game applications of the match participants to load the game environment associated with the game match. The instructions for initiating the game match can depend on the specific game application. In some embodiments, the application host system 442 communicates directly with each user computing system to initiate the match. In some embodiments, the application host system 442 and/or selected host computing device communicates with other match participants to initiate the game match within each game application. In some embodiments, some of the blocks of the process 500 may not be performed, are performed simultaneously, or may be performed in a different order. For example, in some embodiments, the processing analysis or the throughput analysis is not performed, the processing analysis and the throughput analysis may be performed simultaneously, or in a different order.

Throughput Analysis Process

Figure 6:
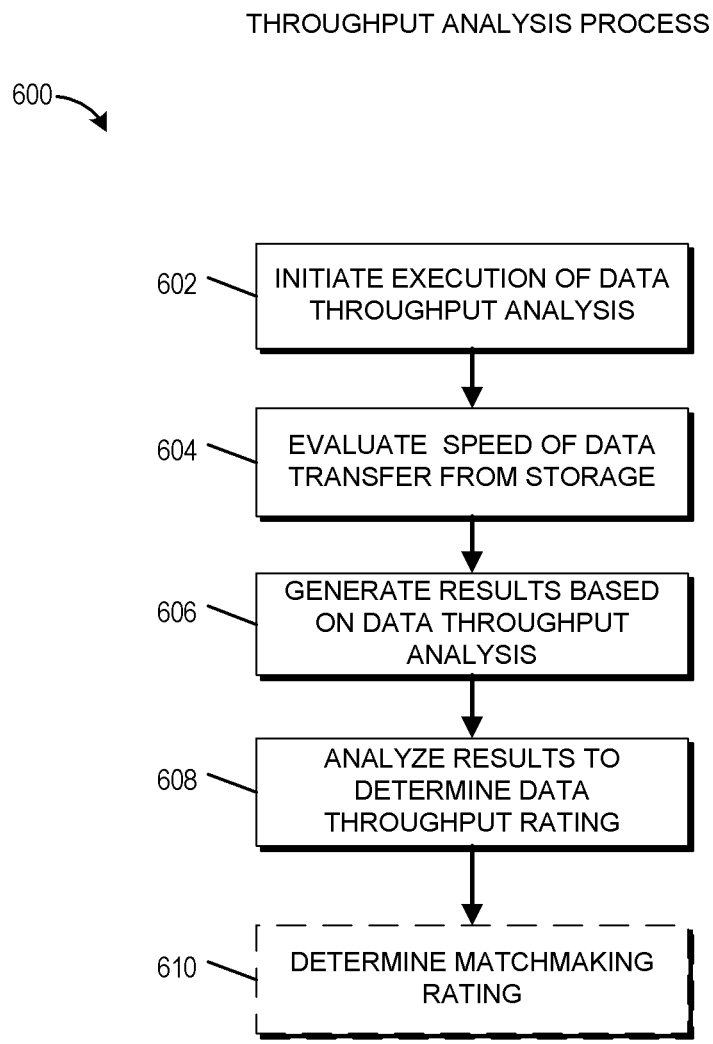
FIG. 6 presents a flowchart of an embodiment of a throughput analysis process.

FIG. 6 presents a flowchart of an embodiment of a throughput analysis process 600 of a user computing system 402. The process 600 can be implemented by any system that can analyze a computing system. For example, the process 600, in whole or in part, can be implemented by matchmaking module 444, the application host system 442, the hardware analysis module 420, the evaluation module 422, the rating module 424, and/or the application 410, among others. Although any number of systems, in whole or in part, can implement the process 600, to simplify discussion, the process 600 will be described with respect to particular systems.

At block 602, the hardware analysis module 420 can initiate execution of the throughput analysis of the storage device on the user computing system 402. At block 604 the hardware analysis module 420 can execute a test to evaluate the speed of data transfer from the storage device on the user computing system 402. The data throughput analysis can execute one or more tests in order to determine the speed of the storage device 40. For example, the evaluation module 422 can execute code that measures the amount of time that it takes for the storage device of the user computing device 402 to load a set amount of data into memory. In some embodiments, the evaluation module 422 can determine a read time of the storage device by executing a test where an identified file is read and the time required to read the file is recorded. In some embodiments, the evaluation module 422 can determine a seek time of the storage device by executing a test where multiple files are read and the results are recorded. In some embodiments, the evaluation module 422 can determine the type of storage device, such as whether the device is a solid state drive or a mechanical drive. At block 606, the system can generate results based on the data throughput analysis At block 608, the hardware analysis module 420 can determine a rating based on the results. In order to determine the rating, the rating module can convert the measurements from the throughput test based on minimum and maximum ranges of speeds to specific ratings. The results could output the specific results of the test, such as, for example, a time in milliseconds or a time for executing the test, or it may output a specific score associated with that test. The results may correspond to categories, for example, results within defined ranges are categorized in a finite number of categories. In some embodiments, the rating is based on a database that provides a rating associated with a storage device type. For example, a SSD storage device can be in one category, and a mechanical storage device can be in a different category.

At block 610, optionally, a matchmaking rating can be determined based, alone or in part, on the matchmaking rating. The throughput analysis rating can be incorporated into a matchmaking rating that can be used by the matchmaking module to select users for individual matches. For example, the matchmaking rating can be an aggregate rating based, in part, on the throughput analysis rating, latency, geographical location, user profile information, and/or other factors that can be used by the matchmaking module to select users for multiplayer game matches. Depending on the embodiment, the throughput data, throughput rating, and/or matchmaking rating can be provided to the application host system 442 for a matchmaking determination.

Processing Analysis Process

Figure 7:
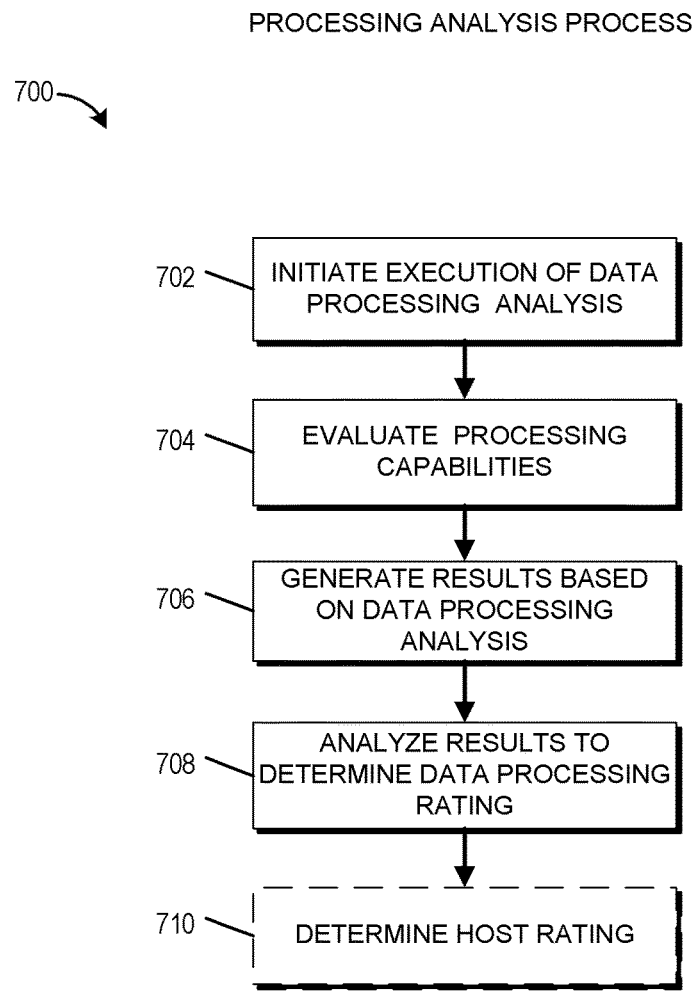
FIG. 7 presents a flowchart of an embodiment of a processing analysis process.

FIG. 7 presents a flowchart of an embodiment of a processing analysis process 700 of a user computing system 402. The process 700 can be implemented by any system that can analyze a computing system. For example, the process 700, in whole or in part, can be implemented by matchmaking module 444, the application host system 442, the hardware analysis module 420, the evaluation module 422, the rating module 424, and/or the application 410, among others. Although any number of systems, in whole or in part, can implement the process 700, to simplify discussion, the process 700 will be described with respect to particular systems.

At block 702, the hardware analysis module 420 can initiate execution of the processing analysis of the storage device on the user computing system. At block 704, the hardware analysis module 420 can empirically determine the performance of the CPU, GPU, memory, and/or other components of the system. The evaluation module 422 can benchmark processing characteristics of the CPU and GPU using one or more tests. In some embodiments, a single test can be run to evaluate the hardware components, whereas in other embodiments, multiple tests can be run to evaluate performance. For example, in some embodiments, to evaluate the CPU, a predetermined problem or calculation can be executed and the time required to complete the problem can be measured. In some embodiments, to evaluate the GPU, a predetermined scene can be rendered and rendering time and framerate can be measured. At block 706, the test generates results based on the data processing analysis.

At block 708, the hardware analysis module analyzes the results to determine a processing rating based on the results of the one or more tests. In some embodiments, the components can receive individual scores based on the result of the test. In some embodiments, a single score may be applied to different components. In some embodiments, individual scores can be generated for the components and an aggregate score can be generated for the user computing system 402. In some embodiments, the aggregate score can use weighted values applied to the individual components score.

At block 710, optionally, the hardware analysis module 420 can determine a host rating. The host rating can be based on the processing analysis rating and other factors. The host rating can aggregate characteristics of the user computing device 402, such as, for example, the CPU rating, GPU rating, throughput analysis rating, latency, geographical location, and/or other hardware considerations that can affect performance of the user computing device 402 during hosting of a game match using a peer-to-peer architecture. Each input for the host rating can have a different weight applied to generate the aggregate host rating.

In some embodiments, the host rating can include historical data associated with a user computing device 402. The historical data can include data that represents how the user computing device 402 performed as a host in previous game matches. For example, the historical data can identify the number of updates to the game state that the host provided at the designated time compared to the number of updates that were missed during the match. In some embodiments, the historical data can be used to weight a calculated host rating. In some embodiments, the throughput analysis may not be incorporated into the host score. Historical data may be collected via telemetry information sent over a network from the host operating the game to the game platform for storage and analysis. Alternatively or in combination, clients to the host may submit telemetry information about the game host to the game platform based on their experience interacting with the host to host the game.

Depending on the embodiment, the processing data, processing rating, and/or host rating can be provided to the application host system 442 for a matchmaking determination.

Additional Embodiments

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method for matchmaking in a network-based game application, the method comprising:
    receiving, by a game application server, a plurality of data throughput ratings from a plurality of user computing systems, each associated with a user computing system of the plurality, and based, at least in part, on throughput analysis data associated with a storage device of the corresponding user computing system;
    receiving, by the game application server, a plurality of data processing ratings from the plurality of user computing systems, each associated with a user computing system of the plurality, and based, at least in part, on processing analysis data associated with a central processing unit of the corresponding user computing system;
    selecting, by the game application server, one of the plurality of user computing systems as a host computing system for providing operational functionality of a game match based at least in part on a data throughput rating and a data processing rating associated with the selected user computing system;
    selecting, by the game application server, one or more of the plurality of user computing systems other than the selected host computing system as match participant computing systems for the game match based at least in part on the data throughput rating associated with the selected match participant computing systems; and
    initiating, by the game application server, the game match with the host and the match participants, wherein the host computing system and the one or more match participant computing systems are each configured to display the game match.

2. The method of claim 1, wherein selecting the one of the plurality of computing systems as the host computing system and selecting one or more of the plurality of user computing systems as the match participants is further based, at least in part, on latency.

3. The method of claim 1, wherein the processing analysis data comprises data associated with a graphics processing unit of the corresponding user computing system.

4. The method of claim 1, wherein the throughput analysis data defines an input/output access rate of the storage device.

5. The method of claim 1, wherein the throughput analysis data defines a type of storage device of the corresponding user computing system.

6. The method of claim 5, wherein each data throughput rating is determined based on the type of the storage device of the corresponding user computing system.

7. A method for hardware analysis of user computing systems for matchmaking in a network-based game application, the method comprising:
    determining, by a user computing system, throughput analysis data associated with a storage device of the user computing system;
    generating, by the user computing system, a data throughput rating associated with the user computing system based at least in part on the throughput analysis data;

determining, by the user computing system, processing analysis data associated with a central processing unit of the user computing system;

generating, by the user computing system, a processing rating associated with the user computing system based at least in part on the processing analysis data;

sending, by the user computing system, the data throughput rating and data processing rating to a game application server;

receiving, by a game application of the user computing system, instructions to configure the user computing system as a host computing system to provide host functionality for an instance of a game match from the game application server, wherein the instructions to host the instance of the game match are based, at least in part, on the data throughput rating and the data processing rating associated with the user computing system; and initiating, by the game application, the game match with a plurality of participants, based, at least in part, instructions received from the game application server, wherein the plurality of participants are associated with user computing systems other than the host computing system and are selected based, at least in part, on individual data processing ratings associated with the user computing systems, wherein the individual data processing ratings were received at the game application server from the user computing systems of the plurality of participants, and wherein the host computing system and the user computing systems of the plurality of participants are each configured to display the game match.

8. The method of claim 7, wherein the processing analysis data comprises data associated with a graphics processing unit of the user computing system.

9. The method of claim 7, wherein the throughput analysis data defines an input/output access rate of the storage device.

10. The method of claim 7, wherein the throughput analysis data defines a type of storage device.

11. The method of claim 7, wherein determining the processing analysis data comprises executing a defined problem for execution by the central processing unit and measuring the execution time of the defined problem.

12. The method of claim 7, wherein determining the processing analysis data comprises identifying the central processing unit and identifying a defined score associated with the identified central processing unit.

13. The method of claim 7 further comprising determining a matchmaking rating based, at least in part, on the data throughput rating and at least one of latency or user profile data.

14. A system for matchmaking in a network-based game application, the system comprising:

a game application server including a hardware processor configured to implement computer-readable instructions, wherein the instructions cause the hardware processor to:

receive a plurality of matchmaking ratings from a plurality of user computing systems, each matchmaking rating corresponding to a user computing system of the plurality, and based, at least in part, on throughput analysis data associated with a storage device of the corresponding user computing system;

receive a plurality of host ratings from the plurality of user computing systems, each host rating corresponding to a user computing system of the plurality and, based at least in part, on processing analysis data associated with a central processing unit corresponding to the user computing system;

select one user computing system of the plurality of user computing systems as a host computing system for providing operational functionality of a game match based at least in part on the matchmaking rating and the host rating associated with the selected user computing system;

select one or more user computing systems of the plurality of user computing systems other than the selected host computing system as match participant computing systems for the game match based at least in part on the matchmaking rating associated with the selected match participant computing systems; and initiate the game match with the host and the one or more match participants, wherein the host computing system and the one or more match participant computing systems are each configured to display the game match.

15. The system of claim 14, wherein selecting the host computing system and the match participant computing systems is further based, at least in part, on latency.

16. The system of claim 14, wherein the processing analysis data comprises data associated with a graphics processing unit of the corresponding user computing system.

17. The system of claim 14, wherein the throughput analysis data defines an input/output access rate of the storage device of the corresponding user computing system.

18. The system of claim 14, wherein the throughput analysis data defines a type of storage device of the corresponding user computing system.

19. The system of claim 18, wherein each data throughput rating is determined based, at least in part, on the type of the storage device of the corresponding user computing system.

20. The system of claim 14, wherein each matchmaking rating is not accessible to a user of the user computing device of the corresponding user computing system.

* * * * *